United States Patent [19]

Takeo et al.

[11] Patent Number: 4,938,253
[45] Date of Patent: Jul. 3, 1990

[54] PAINT DISCHARGE CONTROL DEVICE

[75] Inventors: Tadashi Takeo; Daizo Shiga, both of Saitama, Japan

[73] Assignee: Honda Giken Kogyo Kabushiki Kaisha, Tokyo, Japan

[21] Appl. No.: 756,058

[22] Filed: Jul. 17, 1985

[30] Foreign Application Priority Data

Jul. 17, 1984 [JP] Japan .................................. 59-148198

[51] Int. Cl.$^5$ ............................................. F16K 31/12
[52] U.S. Cl. ........................................ 137/508; 251/63
[58] Field of Search ............... 137/508, 614.16, 614.17, 137/614.19; 251/61.3, 62, 63, 122

[56] References Cited

U.S. PATENT DOCUMENTS

| | | | |
|---|---|---|---|
| 2,367,106 | 1/1945 | Dolch | 137/508 X |
| 2,854,991 | 10/1958 | Webster | 137/613 X |
| 2,970,609 | 2/1961 | Beremand | 137/614.19 X |
| 3,084,865 | 4/1963 | Fleer et al. | 251/122 X |
| 3,373,762 | 3/1968 | Korchak | 137/240 |
| 3,385,522 | 5/1968 | Kock | 239/124 X |
| 3,532,028 | 10/1970 | Cook et al. | 251/122 X |
| 4,486,001 | 12/1984 | Santefort et al. | 257/61.3 |

*Primary Examiner*—John C. Fox
*Attorney, Agent, or Firm*—Irving M. Weiner; Joseph P. Carrier; Pamela S. Burt

[57] ABSTRACT

A paint discharge control device includes a housing having a paint supply port and a paint discharge port defined therein, a paint passage through which the paint supply and discharge ports communicate with each other, a diaphragm disposed in the paint passage and actuatable by air under pressure for controlling the rate of a paint flow through said paint passage, a piston slidably disposed in the housing and having a hole defined therein as part of the paint passage, and a needle valve supported in the housing and having a portion disposed in the hole in the piston. The paint passage includes a paint discharge control passageway defined between the hole and the needle valve portion. The cross-sectional area of the paint discharge control passageway can be varied in response to sliding movement of the piston in the housing.

6 Claims, 3 Drawing Sheets

PAINT DISCHARGE CONTROL DEVICE

BACKGROUND OF THE INVENTION

1. Field of the invention

The present invention relates to a paint discharge control device for use in a painting apparatus.

2. Description of Relevant Art

When painting an automobile body or other objects, the rate of discharge of the paint from a paint coating machine is required to be adjusted dependent on desired coatings. If a smaller area is to be painted or a thinner coating is desired, then the paint should be discharged at a lower rate. If a larger surface is to be coated or a thicker coating layer is desired, a higher paint discharge rate should be selected.

One conventional way for such paint discharge rate adjustment has been to use an air-driven regulator placed in a paint feed passage. The regulator includes a chamber defined by enlarging a portion of the paint feed passage, the chamber being divided by a diaphragm into an air chamber and a paint chamber communicating with a high-pressure paint tank. The paint is supplied from the paint tank by intermittently opening and closing the passage between the paint tank and the paint chamber under the pressure difference between the air chamber and the paint chamber. The rate of pulsations of the diaphragm is varied by changing the air pressure supplied to the air chamber.

In the conventional arrangement, therefore, the air pressure for operating the diaphragm is varied for controlling the rate of discharge of the paint.

By controlling the paint discharge rate with air pressure variations, the paint discharge rate is proportional to the air pressure applied to the diaphragm as indicated by the broken line (b) in FIG. 5 of the accompanying drawings.

The efficiency of a painting process for painting an automobile body, for example, can be increased by abruptly increasing the rate of discharge of the paint. To achieve such an abrupt rate increase, there has been proposed a painting apparatus having a high-rate discharge regulator, in addition to an ordinary low-rate discharge regulator, for abruptly changing the rate of paint discharge. The rate of paint discharge under the air pressure controlled by the high-rate discharge regulator is indicated by the broken line (c) in FIG. 5. The curve (c) shows that fine adjustment of the discharge rate is difficult to attain below the rate 50 cc/min. The paint coated by the high-rate discharge regulator tends to suffer color irregularities. Further, the painting apparatus is complex in construction and cannot easily be controlled.

SUMMARY OF THE INVENTION

It is an object of the present invention to provide a paint discharge control device which is capable of simple fine rate adjustment below a low paint discharge rate, i.e., 50 cc/min. or less, delivers a paint coating without color irregularites, is simple in mechanism, and can easily be controlled.

According to the present invention, there is provided a paint discharge control device including a housing having a paint supply port and a paint discharge port defined therein, a paint passage through which the paint supply and discharge ports communicate with each other, a diaphragm disposed in the paint passage and actuatable by air under pressure for controlling the rate of a paint flow through the paint passage, a piston slidably disposed in the housing and having a hole defined therein as part of the paint passage, and a needle valve supported in the housing and having a portion disposed in the hole in the piston. The paint passage includes a paint discharge control passageway defined between the hole and the needle valve portion, whereby the cross-sectional area of the paint discharge control passageway can be varied in response to sliding movement of the piston in the housing.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
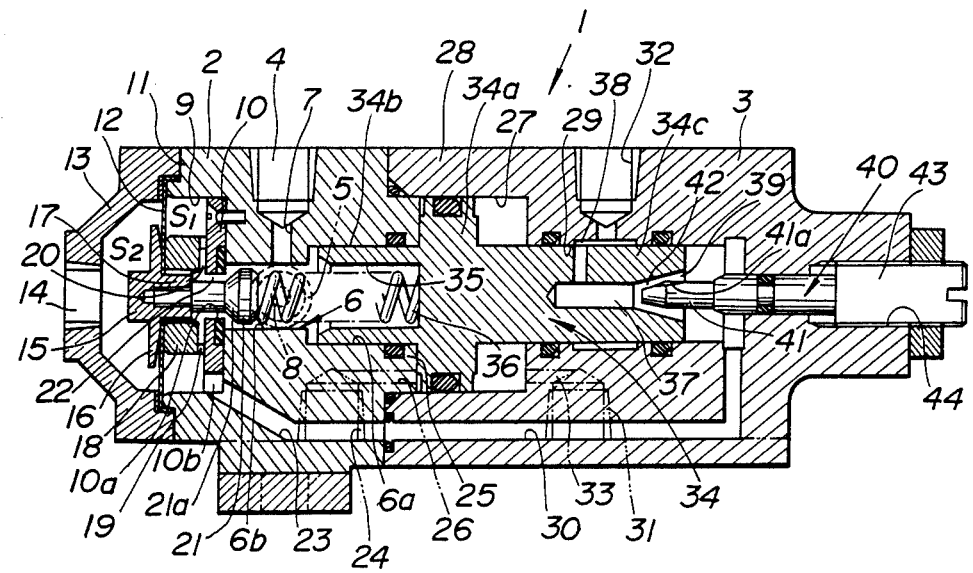
FIG. 1 is a longitudinal cross-sectional view of a paint discharge control device according to an embodiment of the present invention.
Figure 2:
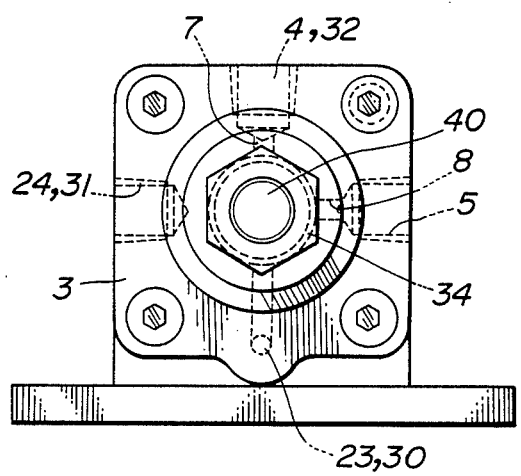
FIG. 2 is an end elevational view of the paint discharge control device shown in FIG. 1.

FIGS. 1 and 2 show a paint discharge control device according to an embodiment of the present invention. The paint discharge control device includes a housing 1 composed of two blocks 2, 3. The block 2 has a paint supply port 4 defined therein and connected to a high-pressure paint tank (not shown) and a hole 5 defined therein for circulating the paint to prevent metallic particles from being settled by gravity. The block 2 has a through hole 6 defined therein out of interference with the paint supply port 4 and the hole 5 and composed of a larger-diameter portion 6a and a smaller-diameter portion 6b. The smaller-diameter hole portion 6b communicates with the paint supply port 4 and the hole 5 through passageways 7, 8, respectively.

The block 2 also has a recess 9 defined in one surface thereof, the smaller-diameter hole portion 6b opening into the recess 9. A plate 10 is fastened to the inner end wall of the recess 9. The plate 10 has a hole 10a coaxial with and smaller in diameter than the smaller-diameter hole portion 6b, and a cutout recess 10b defined in a peripheral edge thereof.

The recess 9 is surrounded by an annular ridge 11 covered with a cap 13 with a diaphragm 12 clamped between the annular ridge 11 and the cap 13. The diaphragm 12 closes the recess 9 to define a space S1 therein. The cap 13 and the diaphragm 12 jointly define a space S2 therebetween which is supplied with air through a port 14 defined through the cap 13.

A holder 15 extending centrally through the diaphragm 12 has a portion disposed in the space S2 and including a flange 16 and an externally threaded portion 17 extending into the space S1 with a nut 18 threaded thereon. The nut 18 has projections 19 on its surface facing the plate 10, the projections 19 being held against the plate 10 to form a paint passageway 20 between the nut 18 and the plate 10. A bolt 21 is threaded centrally into the holder 15 and has a head placed in the smaller-diameter hole portion 6b and including a tapered surface 21a, there being a passageway 22 defined between the shank of the bolt 21 and the wall surface of the plate 10 defining the hole 10a. When the bolt 21 is moved to the left in FIG. 1, the tapered surface 21a engages the plate 10 to cut off the fluid communication between the passageway 22 and the smaller-diameter hole portion 6b.

The block 2 also has a passageway 23 and an air supply port 24. The passageway 23 has one end opening into the space S1 through the cutout recess 10b in the plate 10, and the other end opening at an end face of the block 2 which faces the block 3. The end face of the block 2 has a projection 25 thereon, and an air supply passageway 26 extending from the air supply port 24 has an end opening at the end face of the projection 25.

The block 3 includes an annular ridge 28 defining a larger-diameter recess 27 opening toward the block 2. The blocks 2, 3 are coupled together by fitting the projection 25 of the block 2 into the annular ridge 28.

The block 3 has a hole 29 opening into the recess 27 and having the same diameter as that of the larger-diameter hole portion 6a in the block 2. The block 3 also has a paint passageway 30, an air supply port 31, and a paint discharge port 32. The paint passageway 30 has an open end held in registry with the open end of the passageway 23 in the block 2 and the other end opening into the hole 29. An air supply passageway 33 extends from the air supply port 31 and opens into the recess 27.

With the blocks 2, 3 coupled together, a piston 34 is slidably disposed in the space defined by the larger-diameter hole portion 6a, the recess 27, and the hole 29.

The piston 34 has a flange 34a extending radially outwardly from a central outer peripheral surface thereof and having an outer peripheral surface held in slidable contact with the inner peripheral surface of the recess 27. The piston 34 includes a lefthand portion 34b (as shown) having an outer peripheral surface held in slidable contact with the inner peripheral surface of the larger-diameter hole portion 6a, and a righthand portion 34c having an outer peripheral surface held in slidable contact with the inner peripheral surface of the hole 29. The lefthand portion 34b has a hole 35 defined axially therein and having the same diameter as that of the smaller-diameter hole portion 6b. A spring 36 is placed under compression between the end face of the hole 35 and the head of the bolt 21. The righthand portion 34c has a hole 37 defined therein as part of the paint passage and held in fluid communication with the paint discharge port 32 through a passageway 38. The hole 37 has a righthand tapered portion 39 in which the distal tapered portion 41 of a needle valve 40 is disposed, the tapered hole portion 39 and the tapered valve portion 41 jointly defining a paint discharge control passageway 42 therebetween. The tapered valve portion 41 has a groove 41a defined in its surface.

The paint supply and discharge ports 4, 32 communicate with each other through the passageway 7, the smaller-diameter hole portion 6b, the passageway 22, the passageway 20, the space S1, the passageway 23, the passageway 30, the hole 29, the paint discharge control passageway 42, the hole 37, and the passageway 38.

The needle valve 40 has an externally threaded portion 43 which is threaded in an internally threaded hole 44 in the block 3, so that the needle valve 40 is held in the block 3. By turning the externally threaded portion 43 in the internally threaded hole 44, the length of projection of the needle valve 40 into the hole 37 can be adjusted to vary the cross-sectional area of the paint discharge control passageway 42. The cross-sectional area of the paint discharge control passageway 42 can also be varied by sliding movement of the piston 34.

Figure 3:
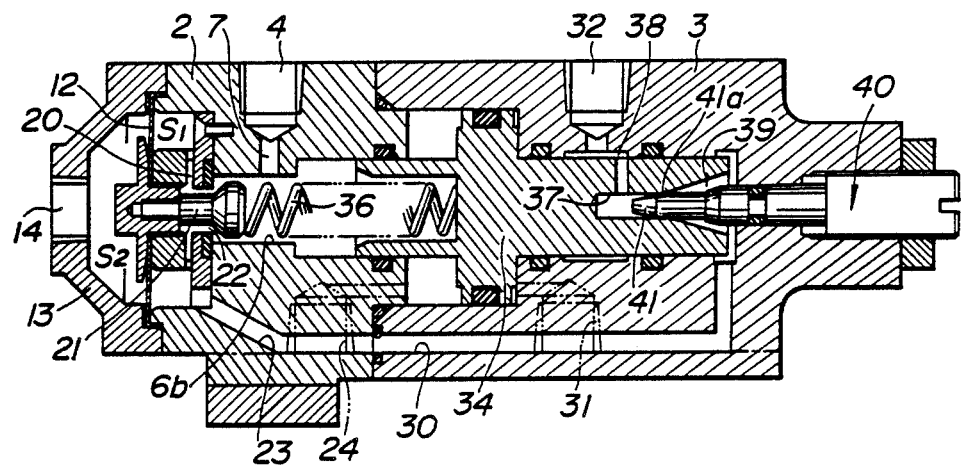
FIG. 3 is a view similar to FIG. 1, illustrating operation of the paint discharge control device.

Operation of the paint discharge control device thus constructed is as follows:

Air is supplied from the air supply port 24 through the passageway 26 into the recess 27 to move the piston 34 to the right as shown in FIG. 3. The cross-sectional area of the paint discharge control passageway 42 is reduced to the extent that the holes 29, 37 communicate with each other only through the groove 41a. In other words, the groove 41a ensures that the passageway 42 is never completely closed.

The paint is supplied from the paint tank through the paint supply port 4, the passageway 7, the smaller-diameter hole portion 6b, the passageway 22, and the passageway 20 into the space S1. As the paint enters the space S1, a pressure buildup in the space S1 displaces the diaphragm 12 to the left to cause the holder 15 and the bolt 21 threaded therein to move to the left until the passageway 22 is closed off by the tapered surface 21a of the bolt 21.

The fluid communication between the space S1 and the high-pressure paint tank is now shut off, and the diaphragm 12 returns to the right under the pressure of compressed air supplied into the space S2. The volume of the space S1 is reduced by the returning diaphragm 12 to develop a pressure buildup for delivering the paint under pressure from the space S1 through the passageway 23, the passageway 30, the hole 29, the paint discharge control passageway 42, the hole 37, and the passageway 38, and then out of the paint discharge port 32 under pressure.

Figure 5:
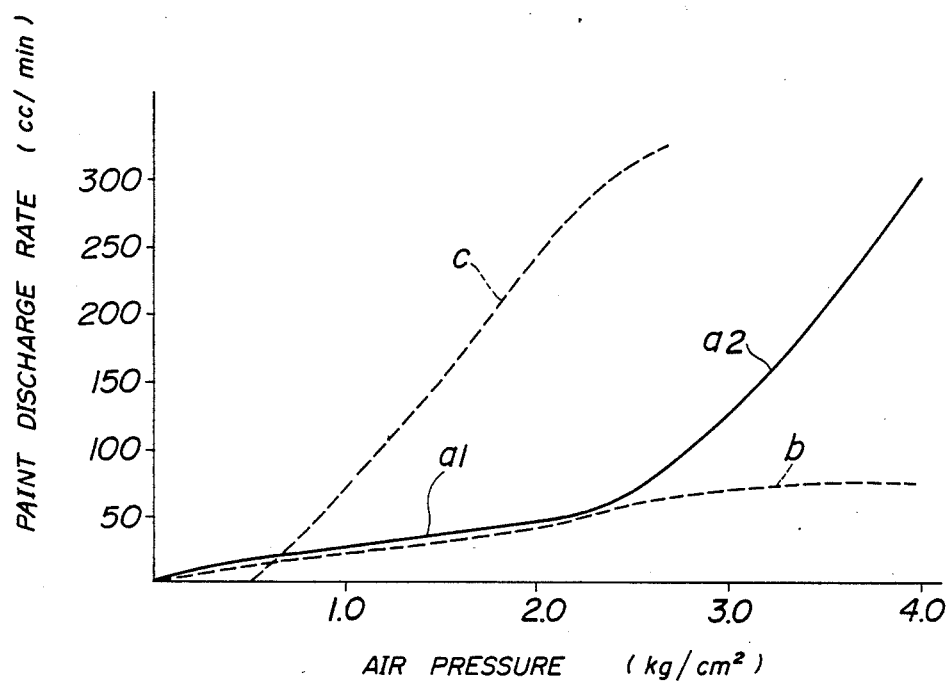
FIG. 5 is a graph showing the relationship between an air pressure acting on a diaphragm and a paint discharge rate.

When the air pressure acting on the diaphragm 12 is increased while the piston 34 remains positioned as shown in FIG. 3, the rate of discharge of the paint from the paint discharge port 32 is progressively increased in proportion to the air pressure as indicated by the solid line $a_1$ in FIG. 5.

When the air supply from the air supply port 24 is stopped, and air is supplied from the air supply port 31 into the recess 27, the piston 34 is moved leftwardly back to the position of FIG. 1. As the piston 34 is moved to the left, the cross-sectional area of the paint discharge control passageway 42 is increased to reduce the resistance to the paint flow in the control passageway 42. Now, the rate of paint discharge is increased exponentially as the air pressure for operating the diaphragm 12 is increased as indicated by the solid line $a_2$ in FIG. 5.

If the range covered by the solid line $a_1$ is increased, then fine rate adjustment at a low discharge rate (50 cc/min. or less) can easily be performed. More specifically, if the junction between the solid lines $a_1$, $a_2$ is moved to the right, then it is easy to effect such fine rate adjustment in the low discharge rate. For fine rate adjustment, the bolt 21 is turned to compress the spring 36 to increase the spring force tending to shift the piston 34 in a direction to close the paint discharge control passageway 42. To increase the rate of paint discharge without substantially increasing the air pressure acting on the diaphragm 12, the bolt 21 is turned in the opposite direction to reduce the resilient force of the spring 36.

Figure 4:
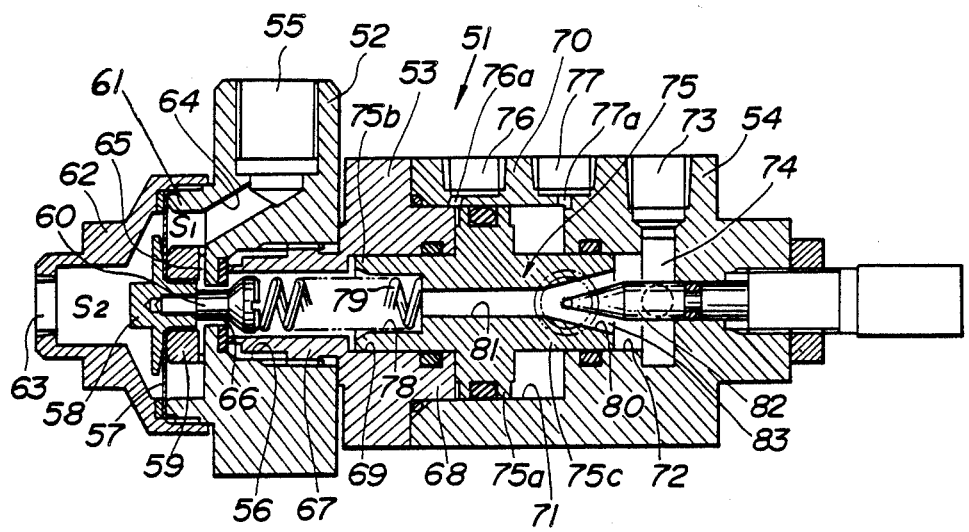
FIG. 4 is a longitudinal cross-sectional view of a paint discharge control device according to another embodiment of the present invention.

FIG. 4 shows in cross section a paint discharge control device according to another embodiment of the present invention. The paint discharge control device includes a housing 51 composed of blocks 52, 53, 54. The block 52 has a paint discharge port 55, a hole 56, and a space S1 bounded by a diaphragm 57. A nut 59 and a bolt 60 are threadedly supported by a holder 58 on the diaphragm 57. The block 52 has an annular ridge 61 covered with a cap 62, and the diaphragm 57 has a peripheral edge clamped between the annular ridge 61 and the cap 62. The cap 62 has an air supply port 63 for supplying air under pressure into a space S2 defined between the cap 62 and the diaphragm 57. The block 52 also has a passageway 64 extending between the paint discharge port 55 and the space S1. A passageway 65 is defined between the nut 59 and the end face of the block 52, and another passageway 66 is defined around the shank of the bolt 60.

The block 53 has an integral hollow cylindrical portion 67 projecting from one end face thereof and threaded in the hole 56 in the block 52, with the head of the bolt 60 being positioned in the cylindrical portion 67. The block 53 also has an annular ridge 68 projecting from the opposite end face thereof and a hole 69 defined centrally in the block 53 and held in fluid communication with the bore of the cylindrical portion 67 across a stepped shoulder.

The block 54 has an integral hollow cylindrical portion 70 projecting from an end face opposite the block 53 and having an inside diameter equal to the outside diameter of the annular ridge 68 of the block 53. The cylindrical portion 70 has a distal end fitted over the annular ridge 68. Thus, the blocks 52, 53, 54 are coupled together. The block 54 also has a hole 72 opening into a recess 71 defined by the cylindrical portion 70. The hole 72 is held in fluid communication through a passageway 74 with a paint supply port 73 defined in the block 54.

With the blocks 53, 54 fitted together, a piston 75 is slidably disposed in the space defined by the holes 69, 72 and the recess 71. The piston 75 has a flange 75a slidably disposed in the recess 71, a lefthand portion 75b (as shown in FIG. 4) slidably disposed in the hole 69, and a righthand portion 75c slidably disposed in the hole 72. The block 54 has an air supply port 76 communicating via a passageway 76a with the recess 71 on one side of the flange 75a and an air supply port 77 communicating via a passageway 77a with the recess 71 on the other side of the flange 75a. When air is supplied through the air supply port 76 into the recess 71, the piston 75 is moved to the right, and when air is supplied through the air supply port 77 into the recess 71, the piston 75 is moved to the left.

The lefthand portion 75b of the piston 75 has a recess 78. A spring 79 is placed under compression between the end face of the recess 78 and the head of the bolt 60. The righthand portion 75c of the piston 75 has a tapered hole 80 defined therein and communicating with the recess 78 through a passageway 81 defined axially in the piston 75.

The block 54 supports a needle valve 82 having a tapered distal end portion disposed in the tapered hole 80, forming a paint discharge control passage 83.

The paint supply and discharge ports 73, 55 are held in fluid communication with each other through the passageway 74, the paint discharge control passageway 83, the passageway 81, the recess 78, the passageway 66, the passageway 65, the space S1, and the passageway 64.

In operation, when the piston 75 is moved to the right by supplying air through the air supply port 76 into the recess 71, the paint discharge control passageway 83 is restricted, and the resulting low rate of discharge of the paint from the paint discharge port 55 is progressively increased in proportion to the air pressure for operating the diaphragm 57. When air is supplied via the air supply port 77 to move the piston 75 to the left to the position of FIG. 4, the paint discharge control passage is not restricted, and the resulting higher rate of discharge of the paint is increased exponentially as the air pressure on the diaphragm 57 is increased.

With the arrangement of the present invention, a regulating means comprised of the piston slidably disposed in the housing of the device and the needle valve is provided in combination with the ordinary regulator composed of a diaphragm. Therefore, the rate of discharge of the paint can be easily and better controlled in a wider range than possible with the conventional control devices. As a result, automobile bodies and other desired objects can efficiently be painted by a painting apparatus combined with the paint discharge control device of the present invention.

Since the device housing is divided into a plurality of blocks with the ordinary regulator assembled in one of the blocks and the control mechanism of the invention in another block or other blocks, the existing regulator can be incorporated without modification into the paint discharge control device of the present invention. Therefore, the paint discharge control device can be manufactured easily and inexpensively.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A paint discharge control device comprising:
    a housing having a paint supply port and a paint discharge port defined therein;
    a paint passage through which said paint supply and discharge ports communicate with each other;
    a diaphragm disposed in said paint passage and actuatable by air under pressure for controlling the rate of a paint flow through said paint passage;
    a piston slidably disposed in said housing and having a hole defined therein as part of said paint passage;
    a needle valve supported in said housing and having a portion disposed in said hole in said piston; and
    said paint passage including a paint discharge control passageway defined between said hole and said needle valve portion, whereby the cross-sectional area of said paint discharge control passageway can be varied in response to sliding movement of said piston in said housing.

2. A paint discharge control device according to claim 1, including a spring disposed in said housing for normally urging said piston to move in a direction to reduce the cross-sectional area of said paint discharge control passageway.

3. A paint discharge control device according to claim 1, wherein said paint discharge control passageway is positioned upstream of said diaphragm in the direction of the paint flow through said paint passage.

4. A paint discharge control device according to claim 1, wherein said paint discharge control passageway is positioned downstream of said diaphragm in the direction of the paint flow through said paint passage.

5. A paint discharge control device according to claim 1, wherein said housing has means for supplying air under pressure to slide said piston in said housing.

6. A paint discharge control device according to claim 1, wherein:
   said needle valve portion has a groove defined therein, whereby said paint discharge control passageway is never completely closed.

* * * * *